United States Patent [19]
Inaba et al.

[11] Patent Number: 5,214,494
[45] Date of Patent: May 25, 1993

[54] LIGHT SENSOR WITH AN ADJUSTABLE SPECTRAL CHARACTERISTIC

[75] Inventors: Masahito Inaba, Ikeda; Masami Sugiyama, Toyonaka, both of Japan

[73] Assignee: Minolta Camera Kabushiki Kaisha, Osaka, Japan

[21] Appl. No.: 754,742

[22] Filed: Sep. 4, 1991

[30] Foreign Application Priority Data

Sep. 4, 1990 [JP] Japan .................................. 2-234864

[51] Int. Cl.$^5$ .......................... G01D 3/51; G02B 5/22; G02B 5/28
[52] U.S. Cl. .................................... 356/419; 250/226; 359/590; 359/890
[58] Field of Search ................ 356/402, 414, 416, 419; 250/226; 359/590, 890, 892

[56] References Cited

U.S. PATENT DOCUMENTS

| | | |
|---|---|---|
| 3,877,818 | 4/1975 | Button . |
| 4,082,464 | 4/1978 | Johnson . |
| 4,084,909 | 4/1978 | Mathisen . |
| 4,443,108 | 4/1984 | Webster .............................. 356/418 |
| 4,662,755 | 5/1987 | Aoki .................................... 356/414 |
| 4,778,263 | 10/1988 | Foltyn . |
| 4,804,271 | 2/1989 | Cammann .......................... 356/416 |

FOREIGN PATENT DOCUMENTS

| | | |
|---|---|---|
| 56-87844 | 7/1981 | Japan .................................. 356/402 |
| 60-169560 | 11/1985 | Japan . |
| 60-178236 | 11/1985 | Japan . |
| 62-22034 | 1/1987 | Japan . |
| 62-103587 | 5/1987 | Japan . |
| 63-208032 | 8/1988 | Japan . |
| 2-114402 | 4/1990 | Japan . |

*Primary Examiner*—Vincent P. McGraw
*Attorney, Agent, or Firm*—Price, Gess & Ubell

[57] ABSTRACT

A light sensor comprises optical filters, an interference filter and a photoelectric converting element which receives and photoelectrically converts light which has passed through the optical filters and the interference filter. An incident angle of the incident light on the interference filter can be changed so as to realize a desirable spectral sensitivity in a combination of the optical filters, the interference filter and the photoelectric converting element. The incident angle can be changed by a mounting structure that can rotate about an optical axis.

14 Claims, 11 Drawing Sheets

FIG.11(A)
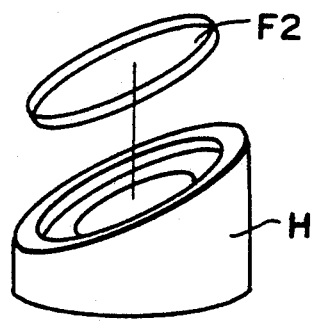
FIG.11(D)     FIG.11(C)     FIG.11(B)
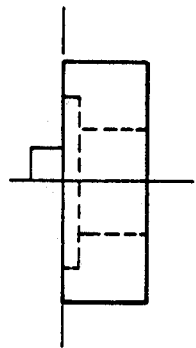 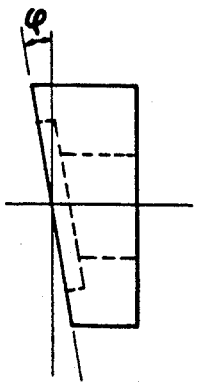 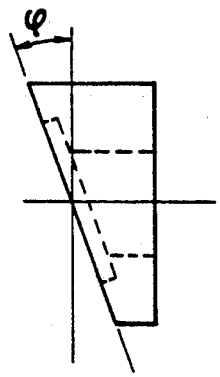
FIG.12
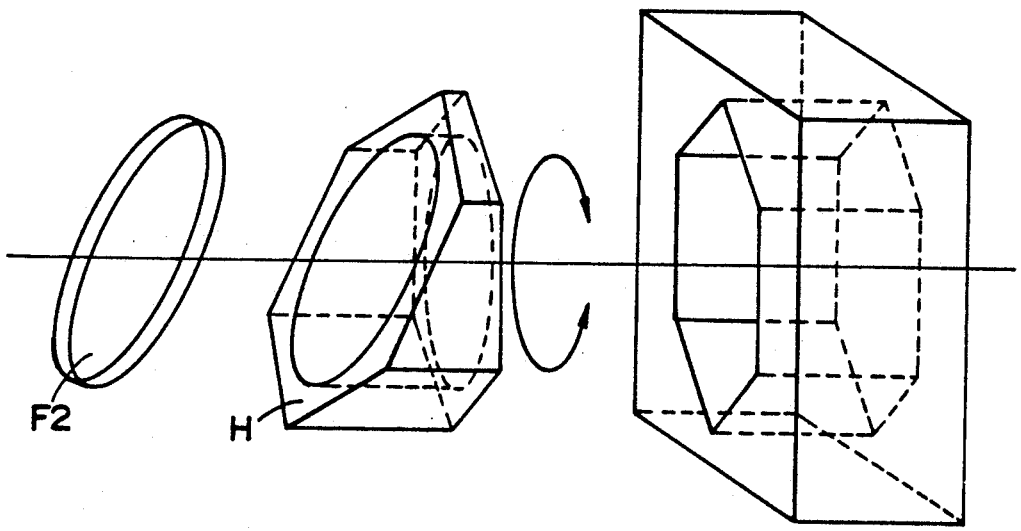

FIG.13(A)    FIG.13(B)    FIG.13(C)
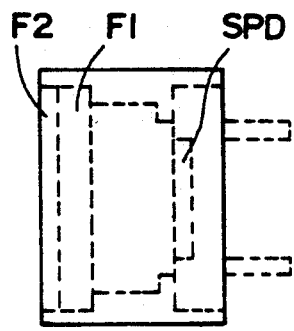
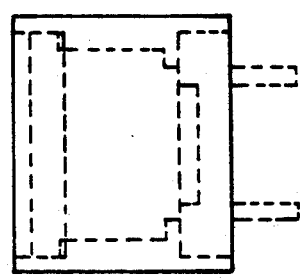
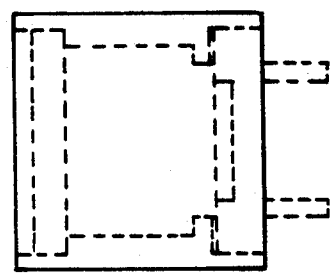
FIG.14(A)    FIG.14(B)    FIG.14(C)
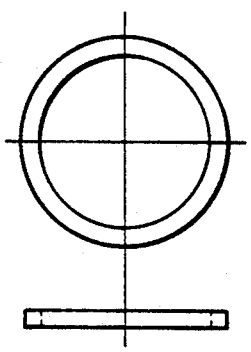
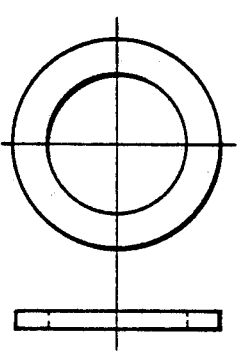
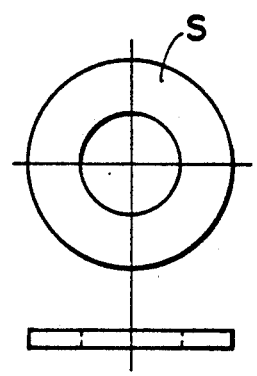
FIG.15(D)   FIG.15(C)   FIG.15(B)   FIG.15(A)
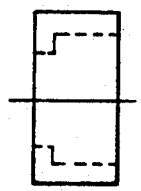
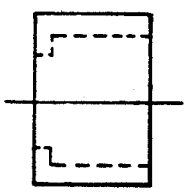
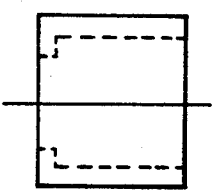
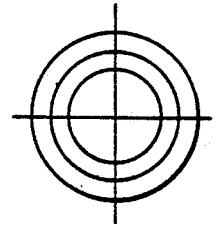

LIGHT SENSOR WITH AN ADJUSTABLE SPECTRAL CHARACTERISTIC

BACKGROUND OF THE INVENTION

1. Field of the Invention

The present invention relates to a spectral sensitivity adjusting mechanism for a light sensor.

2. Description of Related Art

A sensor of a measuring device for measuring light energy, such as a light sensor of an illuminance meter, a luminance meter for evaluating the luminosity factor, a densitometer, and a photoelectric colorimeter for evaluating color and a power meter for measuring an energy amount of a laser beam needs to be adjusted so as to provide a predetermined spectral sensitivity (which can be standard value, such as the ISO, the company standard and the product standard), for example, the spectral sensitivity as shown in FIG. 21. The spectral sensitivity of the light sensor is usually adjusted by correcting the synthetic spectral sensitivity to correspond with a predetermined sensitivity. The synthetic spectral sensitivity is generally created by a multiplication effect of the spectral sensitivities of several kinds of optical filters F1, F2, and F3 (such as a color glass filter, a film filter and an interference filter) and a photoelectric converting element SPD (such as a photoelectric cell, a photoelectric tube, a photomultiplier tube and a photodiode). The optical filters are inserted vertically in the optical path of the incident light before the photoelectric converting element SPD, as shown in FIG. 16. However, the optical filters F1 to F3 can frequently be unequal in their characteristics within manufacturing tolerances, as shown in FIG. 17 to FIG. 19. The photoelectric converting element can also be unequal in sensitivity between individual parts, as shown in FIG. 20. Therefore, even a light sensor formed of a combination of the same kind of optical filter and photoelectric converting element can be unequal in its spectral sensitivity, as shown in FIG. 5.

A color filter and a film filter can be adjusted in both their dispersion effect and their thickness during a manufacturing step of a light filter. As a result, any unequalness in the transmittance among the filters can be reduced to a certain degree. In a forming process of an interference layer on a substrate, a condition in forming a layer can be kept fixed, so that any unequalness in the transmittance among the filters can be reduced to a certain degree. However, in the present technology of filter manufacturing, when a light filter is used as a component of a light sensor without a selecting process, the light sensor cannot be set at a fixed predetermined spectral sensitivity. Therefore, in the present process of manufacturing a sensor having a predetermined spectral sensitivity, a manufacturer of a light sensor will buy only the optical filters capable of fulfilling the predetermined characteristics (transmittance characteristics), or after buying components, the manufacturer will carefully select the components for assembling so that the spectral sensitivity in the combination of an optical filter and a photoelectric converting element can fulfill an objective standard. For manufacturing products in which only a little unequalness among the sensors (unequalness among the devices) is desired, a highly precise optical filter is required to be used. Accordingly, a filter needs to be more strictly selected and the cost of components can become very high.

Generally, an optical filter is inserted vertically in the optical path of the incident light on the photoelectric converting element. But there are examples in which an interference filter can be inserted at an inclination to the optical path of the incident light on the photoelectric converting element. A cold mirror (which reflects longer wavelength light) or a hot mirror (which reflects shorter wavelength light) are such examples. An additional example is a half mirror which is an interference filter having wavelength selecting characteristics by inserting the interference filter at an inclination. Such examples are frequently utilized when the unequalness in the spectral transmittance characteristics (or the spectral reflectance characteristics) do not matter. Further, even if such a filter is inserted at an inclination in the optical path of the incident light on the photoelectric converting element, its spectral transmittance characteristics (or the spectral reflectance characteristics) is not generally adjusted by changing the inclination angle.

SUMMARY OF THE INVENTION

An object of the present invention is to reduce any unequalness among the light sensor devices which is caused by any unequalness in the spectral characteristics of such as a filter and a photoelectric converting element, or any plurality of combinations of an optical filter and a photoelectric converting element.

An interference filter can have characteristics that the cut-off wavelength of the interference filter (the wavelength whose transmittance is ½ of the largest transmittance) changes according to the changing of the inclination angle of the incident light. An object of the present invention is to make the light sensors equal in their spectral sensitivity by adjusting the cut-off wavelength with those characteristics.

Concretely, an interference filter is held by a structure which can adjust an inclination angle relative to the optical axis of the incident light, and is included in a light sensor, so that the inclination angle can be adjusted so as to become the objective wavelength. Various arrangements of structures can provide this result.

When the light which has passed through the diffusion plate passes through an interference filter, the light is incident at various angles from the vertical angle to the largest inclination angle. Then, the inclination angle in the cut-off wavelength part of the spectral characteristics curved line of the interference filter is gradually changed. Accordingly, the larger the largest inclination angle of the incident light is, the more gradually the inclination angle in the spectral characteristics curved line of the interference filter changes. In the present invention, the spectral sensitivity of an interference filter is adjusted by using the above described characteristics.

In this system, by changing the distance between a diffusion plate and a photoelectric converting element, the largest inclination angle of the light, passed through the interference filter, provided between the diffusion plate and the photoelectric converting element can be adjusted. Further, intercepting means having an opening are provided between the diffusion plate and the interference filter. The size of an opening of the intercepting means is adjusted, or the distance between the intercepting means and the photoelectric converting element is adjusted, so that the largest inclination angle of the incident light, passed through the interference filter, is adjusted. Thus, the spectral characteristics of the interference filter can be adjusted.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 9 (B) is an arrangement in view of a diaphragm S with a large opening A in the fourth embodiment.

FIG. 10 (B) is a plan view of an intercepting plate S in another variation of the fourth embodiment.

FIG. 11 is a detailed illustration of a (gradually) adjusting organization of an inclination angle of an interference filter at a filter holding member H in the first embodiment.

FIG. 11 (A) is a perspective view of the adjusting organization.

FIG. 11 (B) is a side view of the adjusting organization whose holding angle $\phi$ is large.

FIG. 11 (C) is a side view of the adjusting organization whose holding angle $\phi$ is small.

FIG. 11 (D) is a side view of the adjusting organization whose holding angle $\phi$ is 0°.

FIG. 12 is a perspective view of an adjusting organization of an inclination angle of an interference filter at a filter holding member H in the second embodiment.

FIG. 13 is an illustration of examples of an adjusting structure of the third embodiment.

FIG. 13 (A) is a side sectional view of the adjusting structure in which the distance between an interference filter and a photoelectric converting element SPD is short.

FIG. 13 (B) is a side sectional view of the adjusting structure in which the distance between an interference filter and a photoelectric converting element SPD is relatively long.

FIG. 13 (C) is a side sectional view of the adjusting structure in which the distance between an interference filter and a photoelectric converting element SPD is longer than FIG. 13.

FIG. 14 (A) is a plan view of an intercepting plate S in the fourth embodiment whose opening is large.

FIG. 14 (B) is a plan view of an intercepting plate S in the fourth embodiment whose opening is relatively small.

FIG. 14 (C) is a plan view of an intercepting plate S in the fourth embodiment whose opening is smaller than FIG. 14 (B).

FIG. 15 (A) is a plan view of a position adjusting member of the intercepting plate in the fourth embodiment.

FIG. 15 (B) is a side sectional view of the position adjusting member in which the intercepting plate is provided far from the interference filter.

FIG. 15 (C) is a side sectional view of the position adjusting member in which the intercepting plate is provided relatively close to the interference filter.

FIG. 15 (D) is a side sectional view of the position adjusting member in which the intercepting plate is provided close to the interference filter.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an economical light sensor assembly.

Figure 1:
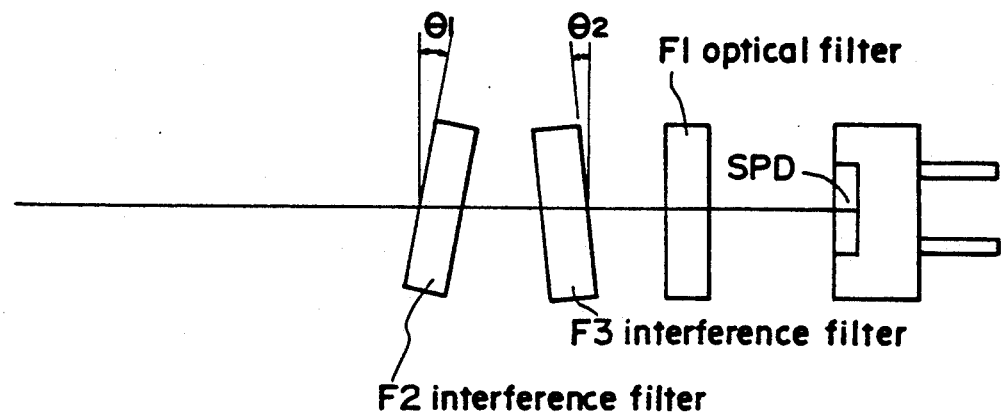
FIG. 1 is an illustration of a basic structure of the present invention.
Figure 17:
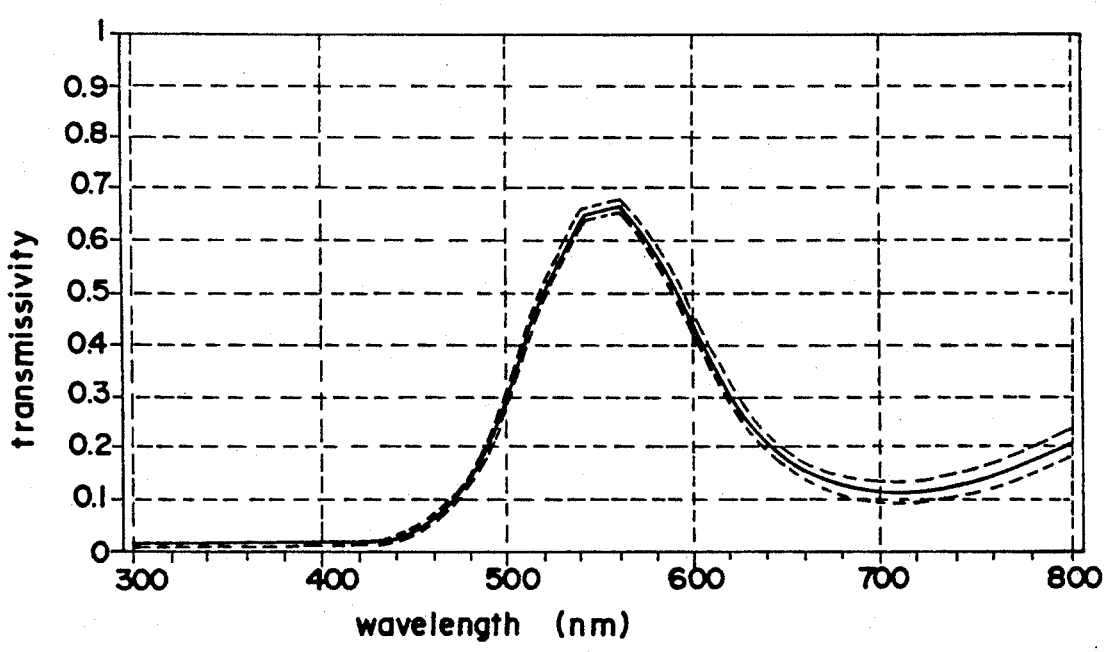
FIG. 17 is a graph showing the transmittance of the optical filter F1 in the prior art.
Figure 18:
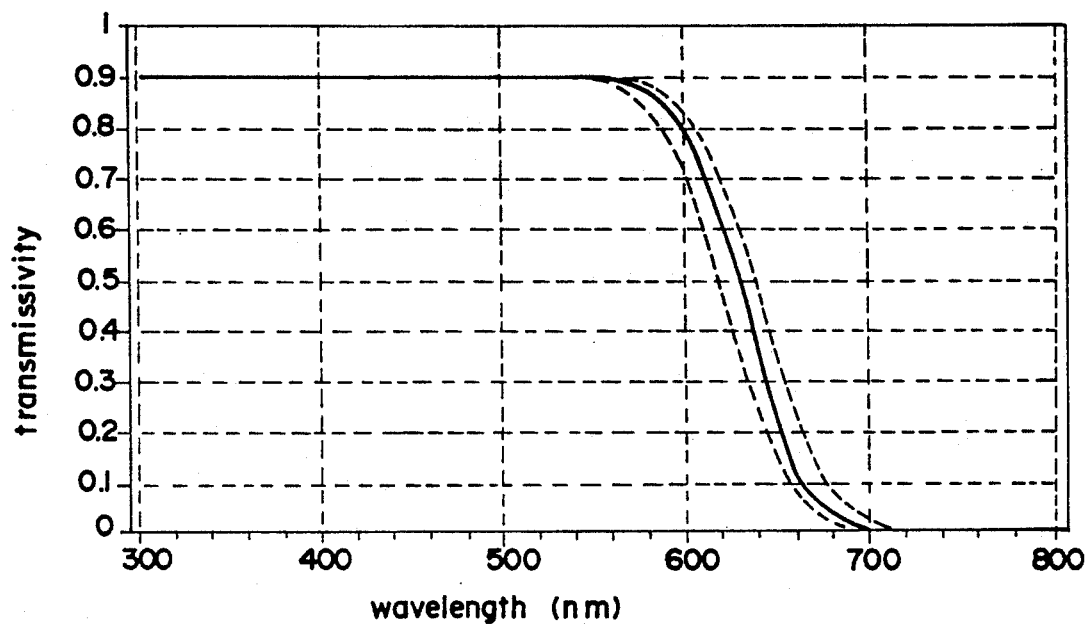
FIG. 18 is a graph showing the transmittance of the interference filter F2.
Figure 19:
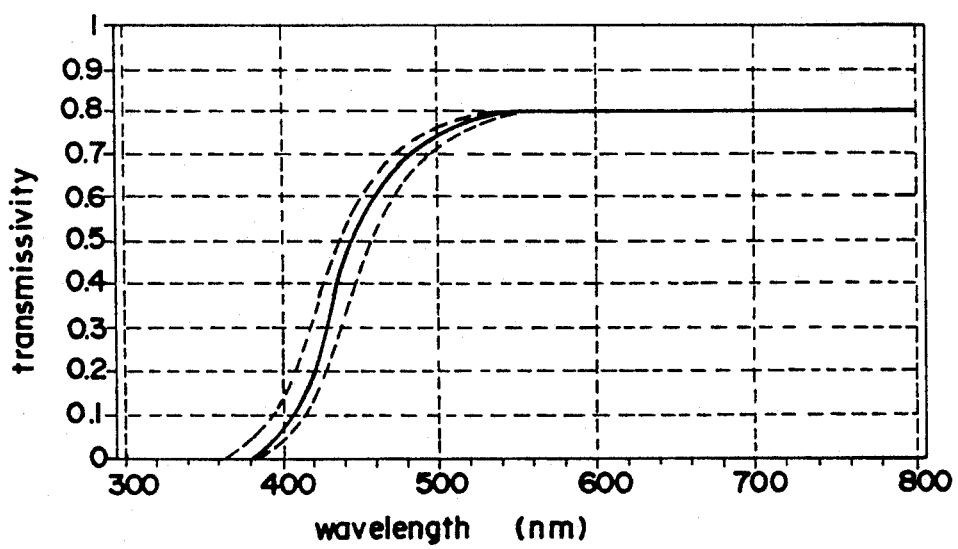
FIG. 19 is a graph showing the transmittance of the optical filter F3.
Figure 20:
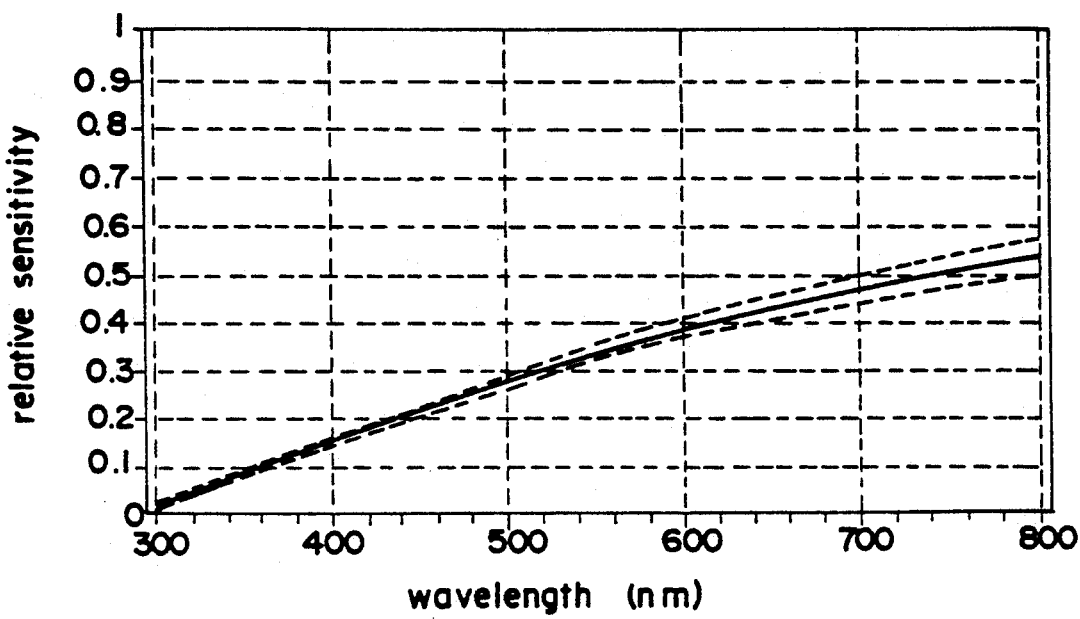
FIG. 20 is a graph showing the spectral sensitivity characteristics of a photoelectric converting element SPD.
Figure 21:
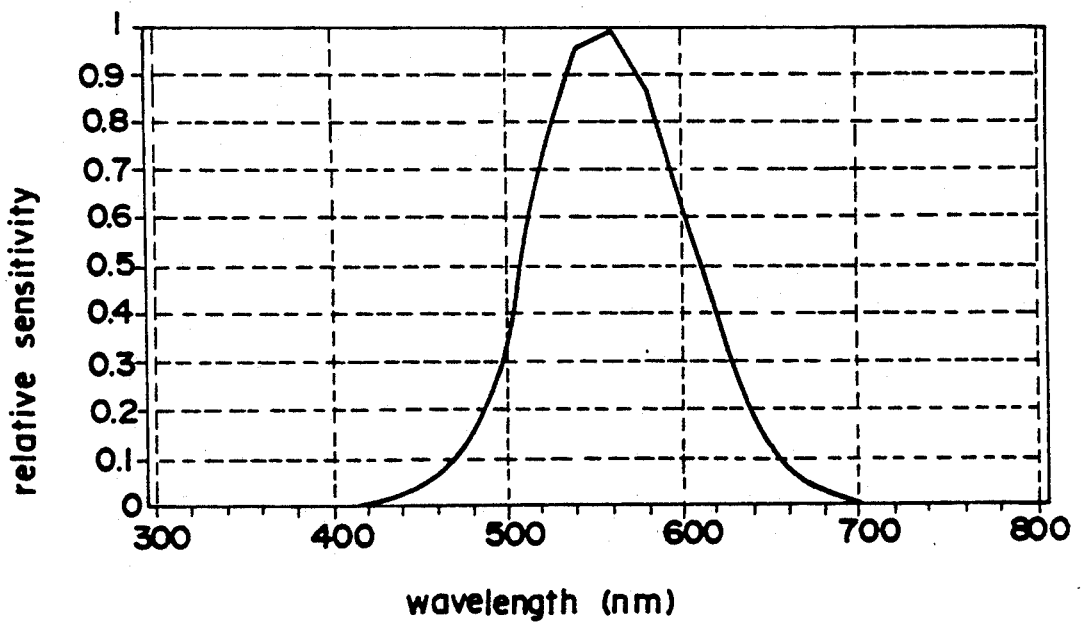
FIG. 21 is a graph showing a desirable luminosity factor curved line.

A general structure of an embodiment of the present invention is shown in FIG. 1 F1 denotes an optical filter (such as a band-pass filter) having spectral sensitivity characteristics as shown in FIG. 17. The optical filter F1 is selected so as to present almost the desired sensitivity characteristics in a combination with a photoelectric converting element SPD having spectral sensitivity characteristics as shown in FIG. 20. F2 denotes an interference filter (longer wavelength cut-off filter) having spectral sensitivity characteristics as shown in FIG. 18. The interference filter F2 corrects sensitivity characteristics on the longer wavelength side of the synthetic spectral characteristics of a light sensor and is provided at an inclination relative to the optical axis. By adjusting an angle of the inclination $\theta_1$, a cut-off wavelength is changed, so that the sensitivity characteristics on the longer wavelength side of the synthetic spectral characteristics can be corrected. F3 denotes an interference filter (shorter wavelength cut-off filter) having spectral sensitivity characteristics as shown in FIG. 19. The interference filter F3 can adjust its inclination angle $\theta_2$, similar to the F2 filter, and corrects sensitivity characteristics on the shorter wavelength side of the synthetic spectral characteristics.

Figure 2:
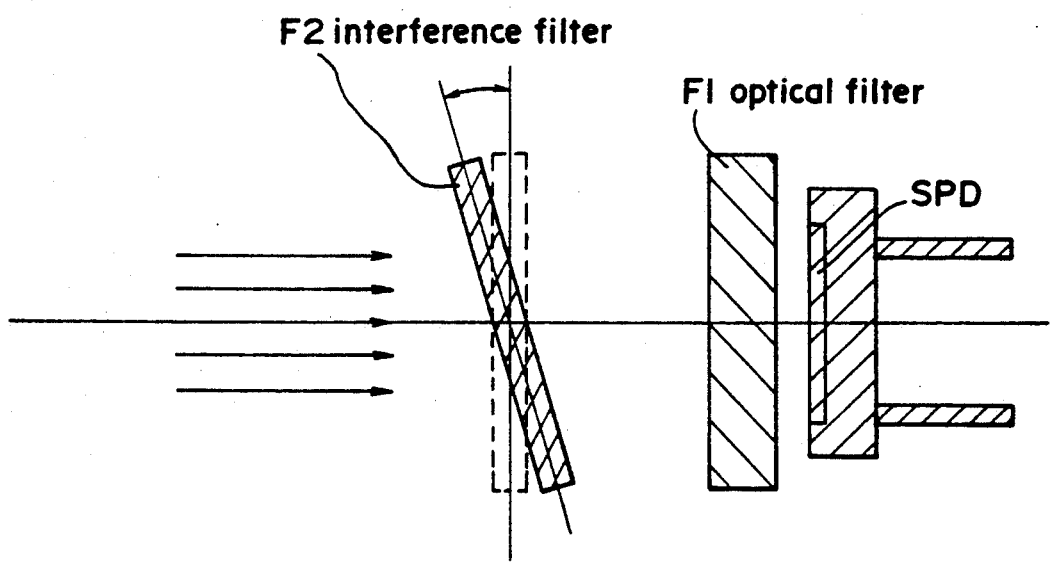
FIG. 2 is an illustration of a structure of the first embodiment of the present invention.
Figure 3:
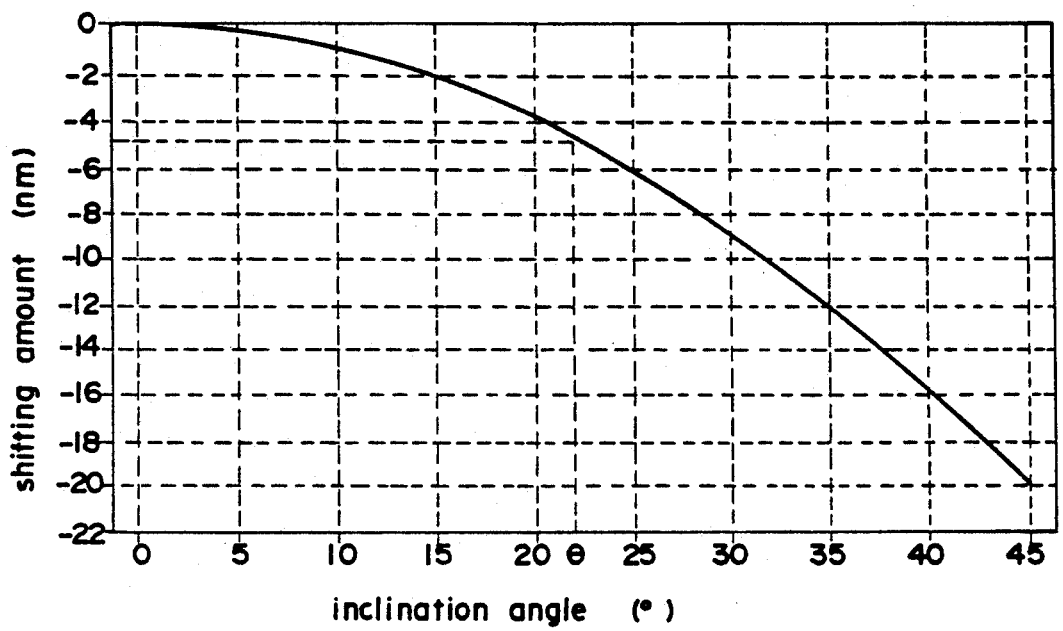
FIG. 3 is a graph showing a relationship between an inclination angle of the interference filter F2 and the wavelength shifting amount of the embodiment.
Figure 4:
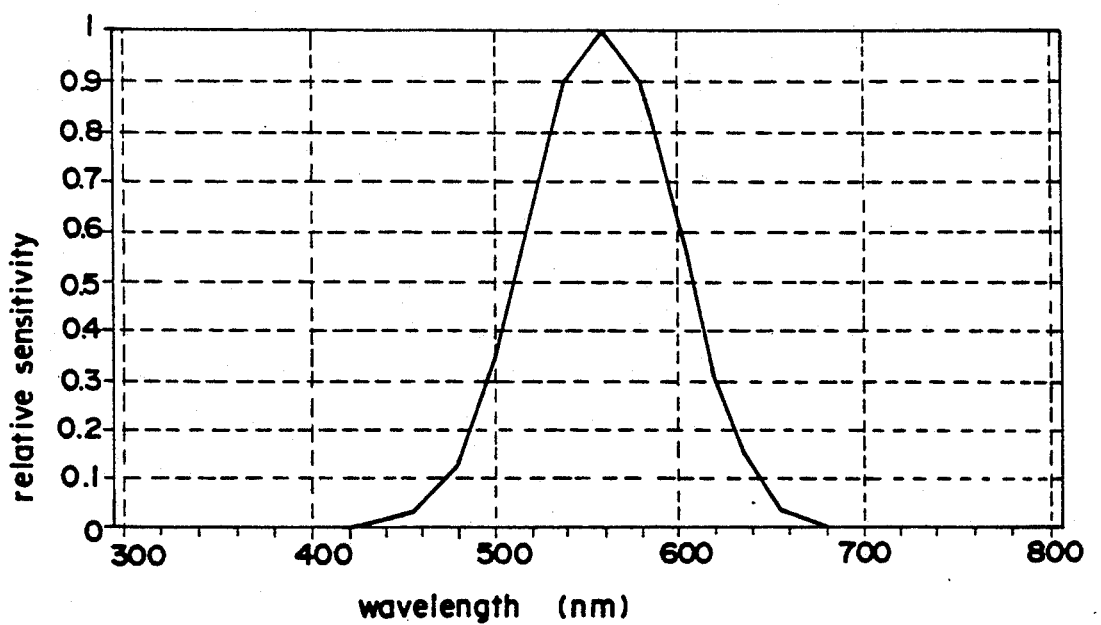
FIG. 4 is a graph showing a spectral sensitivity of a luminosity factor sensor of the embodiment.
Figure 5:
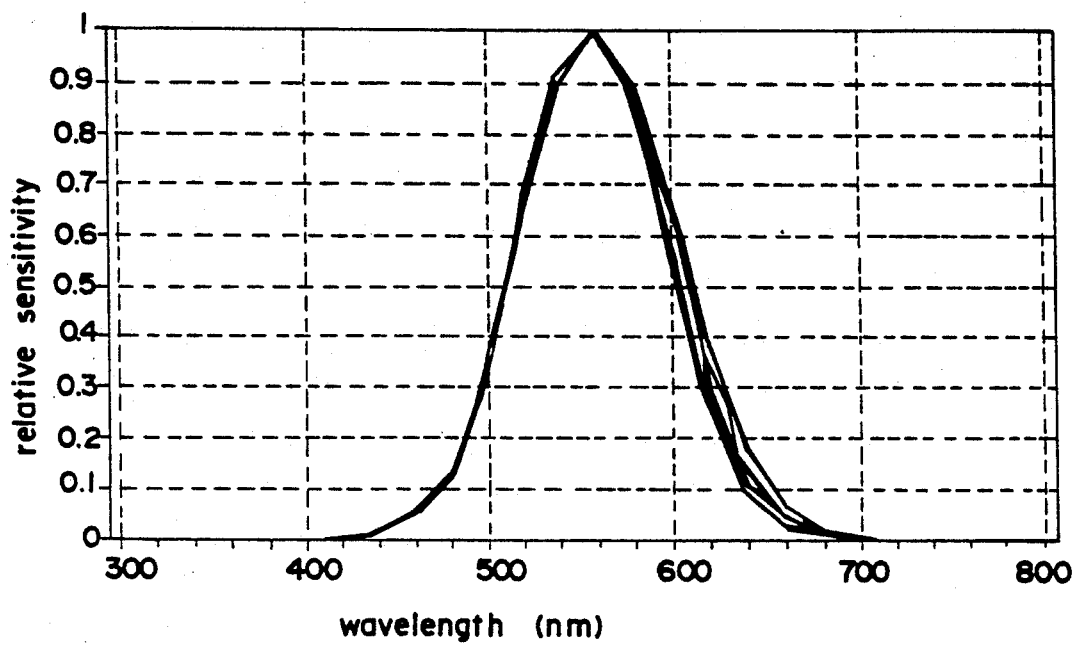
FIG. 5 is a graph showing a spectral sensitivity of a luminosity factor sensor without adjusting.

In FIG. 2, a first embodiment of the present invention is shown. The embodiment shows only adjusting on the longer wavelength side. Concerning the shorter wavelength side, a similar embodiment can be supposed to exist. In FIG. 2, the optical filter F1, having spectral characteristics as shown in FIG. 17, and the photoelectric converting element SPD, having spectral characteristics as shown in FIG. 20, are provided vertically to the optical axis in the optical path of the incident light. The interference filer (longer wavelength cut-off type) F2 having spectral characteristics as shown in FIG. 18 is held in a manner that permits rotatable movement around a vertical axis to the optical axis so that the inclination angle $\theta$ relative to the optical axis of the incident light can be adjusted. Only the light passing through the optical filters F1 and F2 is incident on the photoelectric converting element SPD. The interference filter F2 has a characteristic that the cut-off wavelength of the interference filter (the wavelength whose transmittance is $\frac{1}{2}$ of the largest transmittance) changes when a transmitting plane is inclined and the incident angle of the incident light is changed. FIG. 2 shows the relationship between the inclination angle $\theta$ of the interference filter and the optical axis and the shifting amount of the cut-off wavelength. As clearly shown in FIG. 3, when the cut-off wavelength corresponding to the inclination angle $\theta$ being 0 is supposed as a standard, the cut-off wavelength shifts to the shorter wavelength side according to the increase of the inclination angle $\theta$. In the present invention, the cut-off wavelength is adjusted by using this characteristics. For example, if it is supposed that the objective wavelength for adjusting the cut-off wavelength is 650 nm, then the cut-off wavelength of each filter is dispersed in the range between 650 nm and 670 nm under the condition of the inclination angle $\theta$ being 0. The difference amount is calculated between the cut-off wavelength and the objective wavelength under the condition of the inclination angle $\theta$ being 0. With the calculated difference amount, namely, the wavelength shifting amount, the inclination angle $\theta$ of the interference filter adapted to the objective wavelength is calculated according to the graph in FIG. 3. The inclination angle of the interference filter F2 is adjusted so as to become the calculated inclination angle $\theta$. Then, as shown in FIG. 2, the interference filter F2 is inserted in the light sensor and the cut-off wavelength of the interference filter is set at the predetermined value. Thus, unequalness among the devices can be corrected. Therefore, when the interference filter is inserted vertically to the optical axis, the dispersion of the relative spectral sensitivity of the light sensor shown in FIG. 5 is reduced as shown in FIG. 4.

The output of the light sensor is used after correcting the signal level to be fixed in receiving the reference light having the predetermined spectral radiation characteristics, in a processing circuit in a later step. The shifting amount (the inclination angle) of the cut-off wavelength of the interference filter F2 is determined so as to fix an integrated value of the product of the relative spectral sensitivity of the light sensor and the spectral energy of the predetermined reference light so that any unequalness among the manufactured light sensors can be reduced.

When an interference filter which is a shorter wavelength cut-off type is inserted in the light sensor, the dispersion of the relative spectral sensitivity of the light sensor in the shorter wavelength sensitivity range can be also adjusted, similar to the case of the above described interference filter which is a longer wavelength cut-off type, by the same method.

Figure 6:
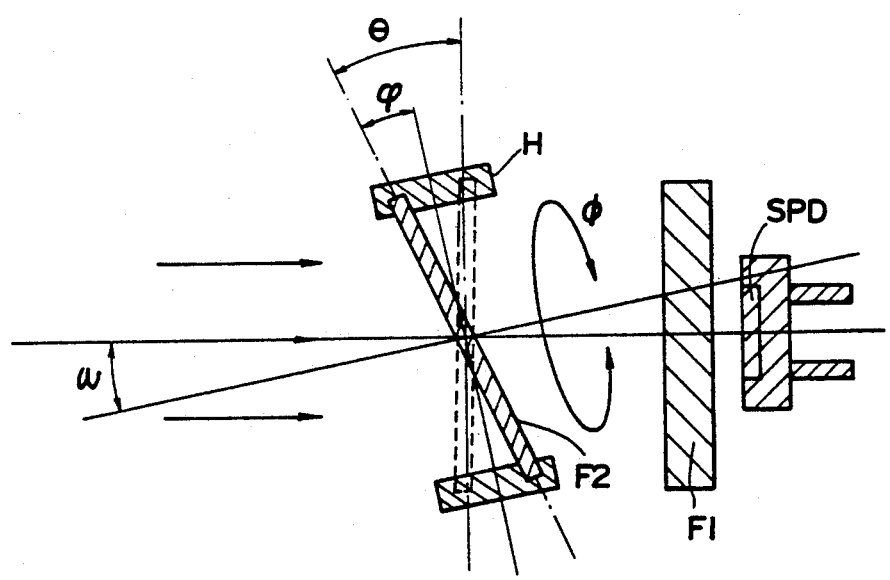
FIG. 6 is an illustration of a structure of the second embodiment of the present invention.

FIG. 6 shows a second embodiment. The interference filter F2 is fixed to a filter holding member H at the inclination angle $\phi$. The filter holding member H is fixed rotatably around an axis on a plane A. The plane A and the axis on the plane A are provided at the angle of $\omega$ to the optical axis of the incident light. Namely, the interference filter F2 is held at the angle $\phi$ to the plane A in the optical path of the incident light. When the holding member H is rotated around the vertical axis of the plane A, the angle $\theta$ can be changed in the range of:

$$0° \leq \omega - \phi \leq \theta \leq \omega + \phi \leq 90°$$

Figure 7:
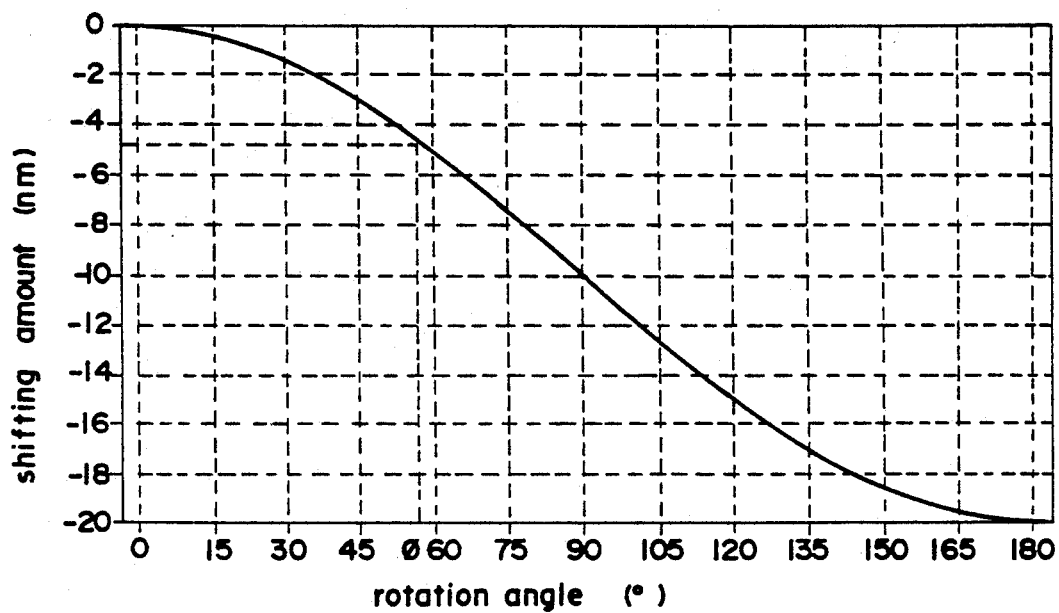
FIG. 7 is a graph showing a relationship between an inclination angle of the interference filter F2 and the wavelength shifting amount of the second embodiment.

As shown in FIG. 7, the relation between the rotating angle $\phi$ of the holding member and the wavelength shifting amount of the cut-off wavelength of the interference filter F2 is calculated in advance. The standard position of the rotating angle $\phi$ is the position of the holding member at which the inclination angle of the interference filter relative to the optical path of the incident light is the largest angle. Then, according to the difference between the cut-off wavelength of the interference filter F2 and the objective wavelength, the most suitable rotating angle $\phi$ of the holding member H can be determined.

Figure 8:
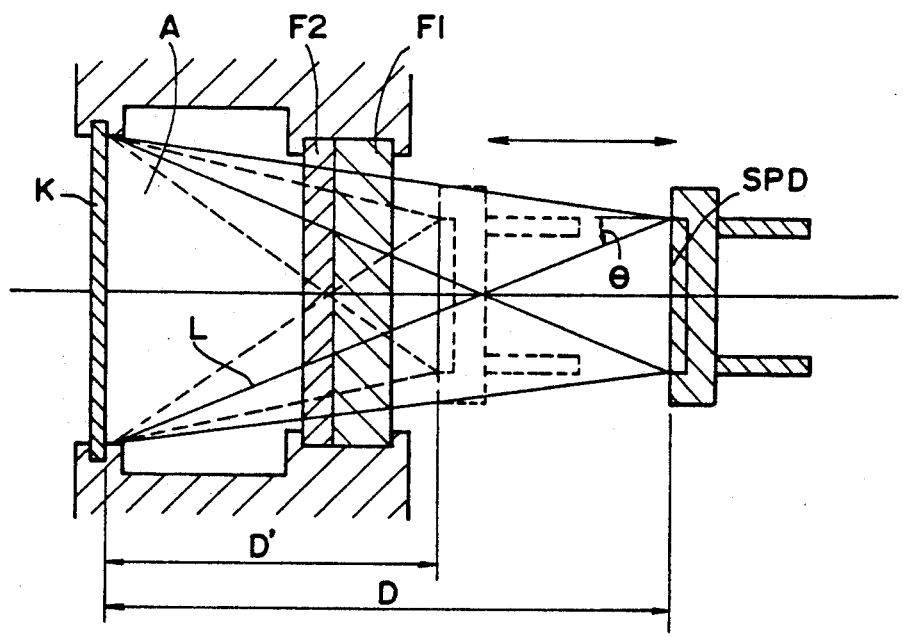
FIG. 8 is an illustration of a structure of the third embodiment in the present invention.

FIG. 8 shows a third embodiment. A diffusion member K is provided at an opening A of the light sensor on which the light is incident. The interference filters F1 and F2 and the photoelectric converting element SPD are provided vertically to and in the optical axis which is common with the opening A. (It is not necessary to be vertical, but here, they are provided vertically for simple explanation.) The light which has passed through the diffusion member K is diffused by the diffusion member K and is incident at various angles between 0 (vertically incident) and $\theta$ (the largest incident angle among the light passing through the interference filter, namely, the incident angle of the light L shown in FIG. 8) against the interference filter plane. Comparing the cases of the light passed through the diffusion member K and the vertically incident light, the cut-off wavelength of the interference filter shifts to the shorter wavelength side in the case of the light which has passed through the diffusion member K. When the distance between the opening A of the light sensor and the photoelectric converting element SPD is changed, the range of the incident angle between 0° and $\theta$° of the effective incident light on the interference filter is changed. Then, the cut-off wavelength of the interference filter can be shifted to the shorter wavelength side. Therefore, the most suitable distance D between the opening A of the light sensor and the photoelectric converting element SPD can be determined according to the difference between the distance D, the cut-off wavelength of the interference filter F2 and the objective wavelength.

Figure 9A:
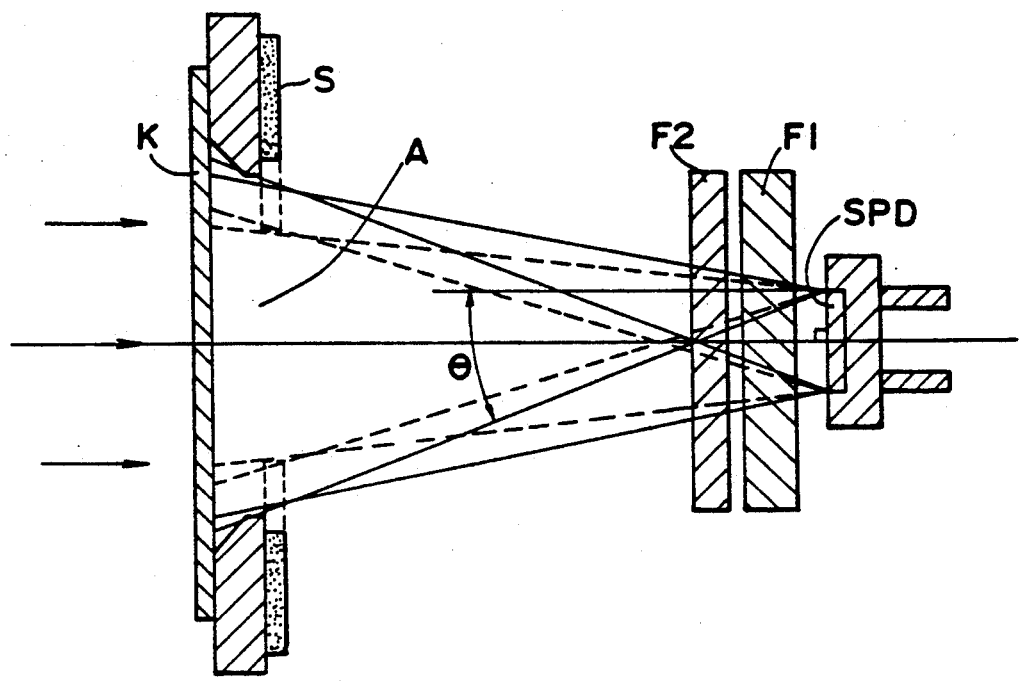
FIG. 9 (A) is an illustration of a structure of the fourth embodiment in the present invention.
FIG. 9(C) is an arrangement view of a diaphragm S with a small opening A n the fourth embodiment.
Figure 9B:
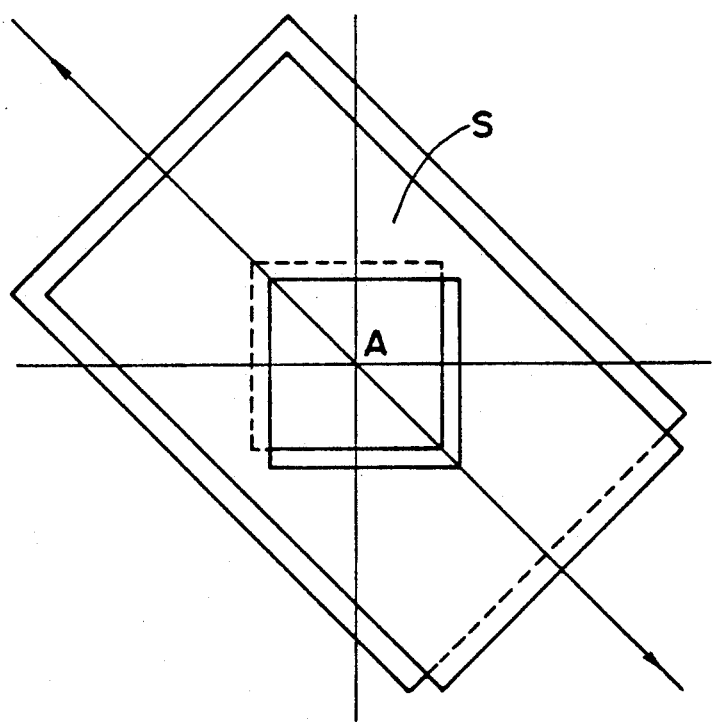
Figure 9C:
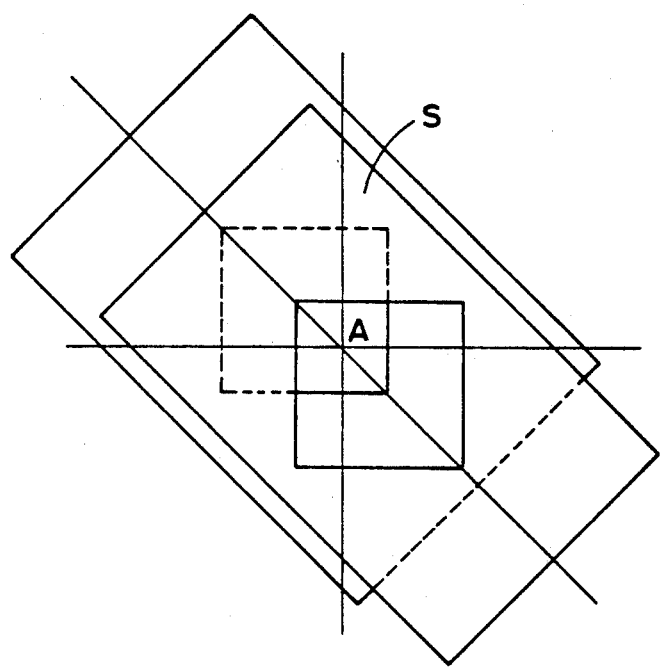
Figure 10A:
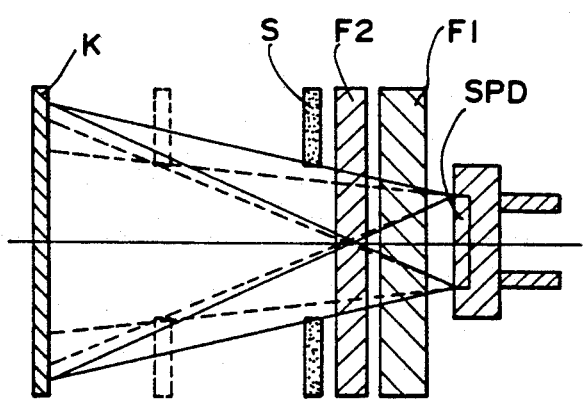
FIG. 10 (A) is an illustration of a structure in another form of the fourth embodiment.
Figure 10B:
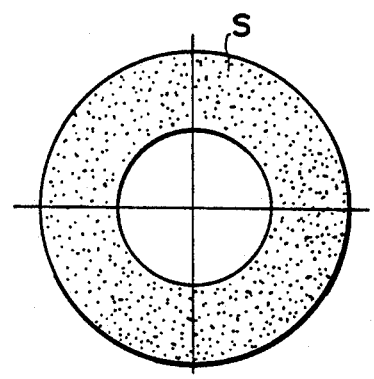
Figure 16:
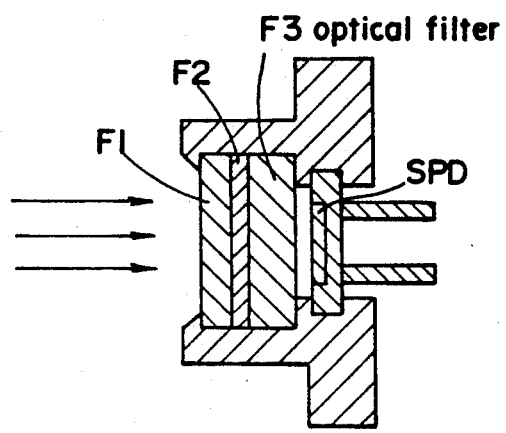
FIG. 16 is an illustration of a structure in the prior art.

FIG. 9 shows a fourth embodiment. In the fourth embodiment, the cut-off wavelength is changed under the condition that light of various incident angles passes through the interference filter F2, similar to the third embodiment. A difference from the third embodiment is to adjust the incident angle range of the light on the interference filter by fixing the distance between the opening A and the photoelectric converting element SPD and changing the size of the opening A. For changing the size of the opening A, a member (S), such as a diaphragm of a camera, can be provided between the opening A and the interference filter F2. Further, an intercepting plate [(S) shown in FIG. 10] having a smaller opening than the opening A can be provided so as to move in the direction of the optical axis connecting the center points of the opening A and the photoelectric converting element SPD (see FIG. 10). The intercepting plate can be provided between the interference filter F2 and the photoelectric converting element SPD.

In the above described four kinds of embodiment from the first to the fourth, the cut-off wavelength of the interference filters can be strictly corresponded. However, when a product is designed practically, utmost performance is not always required. Therefore, within the performance range of a required product, and also within the range of a guaranteed performance in adjusting, a structure which is possible to adjust gradually can be easier in its structure design and its process of manufacturing. Several concrete examples of the adjusting member for adjusting gradually corresponding to the embodiments from the first to the fourth is described hereinafter. FIG. 11 shows concrete examples of the filter holding member H in the first embodiment. FIG. 11 (A) is a perspective view of the filter holding member H whose one face for fixing the interference filter is inclined at the angle $\phi$ against a vertical plane to the optical path of the incident light. The largest inclination angle of the interference filter is adjusted by manufacturing several holding members whose angle $\phi$ are respectively different as shown in FIG. 11 (B) to (D) and changing the holding members. FIG. 12 shows a concrete example of the holding member H in the second embodiment. In FIG. 12, an organization for adjusting the rotating angle $\phi$ of the holding member H is shown. A vertical section of the holding member H is a polygon and a hole in the same shape is formed on the position which is for fixing the holding member inclined relative to the optical axis. The rotating angle $\phi$ is adjusted by shifting the holding member H against the fixing position.

FIG. 13 shows an organization for adjusting the distance between the filter group and the photoelectric converting element SPD in the third embodiment. Frames [(A) to (C)] holding a filter group and a photoelectric converting element SPD are manufactured so that the distance between the filter group and the photoelectric converting element SPD should be different for every frame. By changing the frames [(A) to (C)], the distance between the filter group and the photoelectric converting element SPD can be adjusted. FIG. 14 shows concrete examples of the intercepting plate S in the embodiment shown in FIG. 10. The openings of the intercepting plates shown in FIG. 13 are different in size. By changing the intercepting plates (A) to (C), the largest incident angle can be adjusted. FIG. 15 shows concrete examples of a position adjusting member of the intercepting plate in the embodiment shown in FIG. 10. In the position adjusting member, the intercepting plate is molded together with a cylinder and is provided so that an edge of the cylinder should contact with the interference filter. Accordingly, the distance between the interference filter and the intercepting plate can be set. Several position adjusting members whose structure are as above described and whose cylinders are different in length, such as (B) to (D), are manufactured in advance. By selecting and providing one of the position adjusting members so that the intercepting plate can be provided at the desirable position, the light can be incident at the desirable largest incident angel.

The invention may be embodied in other specific forms without departing from the spirit or essential characteristics thereof. The present embodiments are therefore to be considered in all respects as illustrative and not restrictive, the scope of the invention being indicated by the appended claims rather than bye the foregoing description and all changes which come within the meaning and range of equivalency of the claims are therefore intended to be embraced therein.

What is claimed is:

1. A light sensor comprising:
   at least one optical filter having similar spectral characteristics to predetermined spectral characteristics;
   an interference filter which function as a wavelength cut-off filter;
   a photoelectric converting element for receiving and photoelectrically converting light that has passed through said optical filter and said interference filter, and
   incident angle changing means for shifting a cut-off wavelength of said interference filter by changing an incident angle of the incident light on said interference filter and for adjusting a total spectral sensitivity in a combination of said optical filter, said interference filter and said photoelectric converting element to the predetermined spectral sensitivity.

2. The light sensor as claimed in claim 1, wherein said optical filter has a spectral sensitivity similar to the desirable spectral sensitivity.

3. The light sensor as claimed in claim 1, wherein said incident angle changing means comprise holding means for holding said interference filter rotatably around a vertical axis to an optical axis of the light.

4. The light sensor as claimed in claim 1, wherein said incident angle changing means comprise holding means, which are held rotatably by an inclined axis against an optical axis of the light, for holding said interference filter so that an incident plane of the light on said interference filter should be inclined relative to a vertical plane to a rotating axis of said holding means.

5. The light sensor as claimed in claim 1, wherein said incident angle changing means comprise:
   diffusion means which is provided before said interference filter, for diffusing the light, and
   adjusting means for adjusting the distance between said diffusion means and said photoelectric changing means.

6. The light sensor as claimed in claim 1, wherein said incident angle changing means comprise:
   diffusion means which is provided before said interference filter, for diffusing the light;
   light blocking means which has an opening whose size is changeable and is provided between said diffusion means and said interference filter, and
   adjusting means for adjusting the opening size of said opening means.

7. The light sensor as claimed in claim 1, wherein said incident angle changing means comprise:
   diffusion means which is provided before said interference filter, for diffusing the light;

light blocking means which has an opening and is provided between said diffusion means and said interference filter, and adjusting means for adjusting a position of said opening means in the optical axis of the light.

8. The light sensor as claimed in claim 1, wherein said incident angle changing means comprise a plurality of changeable holding means whose inclination angle is different from each other, for holding said interference filter at an inclination against the optical axis of the light.

9. The light sensor as claimed in claim 1, wherein said incident angle changing means comprise:

first holding means for holding said interference filter at an inclination relative to the optical axis of the light, and second holding means which can be inserted in a plural position on the outside surface of said first holding means and whose direction in inserting is inclined relative to the optical axis of the light.

10. The light sensor as claimed in claim 1, wherein said incident angle changing means comprise:

diffusion means which are provided before an interference filter for diffusing the light, and a plurality of changeable holding members which can hold said diffusion means and said photoelectric converting means and in which the distance between said diffusion means and said photoelectric converting means is different respectively.

11. The light sensor as claimed in claim 1, wherein said incident angle changing means comprise:

diffusion means which are provided before an interference filter for diffusing the light, and a plurality of changeable opening members having an opening, which can be provided between said diffusion means and said interference filter and whose openings are different, respectively.

12. The light sensor as claimed in claim 1, wherein said incident angle changing means comprise:

diffusion means which are provided before an interference filter for diffusing the light, and a plurality of changeable cylindrical opening members having an opening, which can be provided so that one end can contact with said diffusion means between said diffusion member and said interference filter and whose lengths are different, respectively.

13. A spectral characteristics adjusting device comprising:

at least one optical filter having similar spectral characteristics to predetermined spectral characteristics;

an interference filter which functions as a wavelength cut-off filter, and incident angle changing means for shifting a cut-off wavelength of said interference filter by changing an incident angle of the incident light on said interference filter and for adjusting total spectral characteristics in a combination of said optical filter and said interference filter to the predetermined spectral characteristics.

14. A non-moving light sensor assembly for measuring a predetermined spectral band of light, comprising:

a first optical filter for providing a predetermined spectral range of transmission;

a second interference filter, positioned adjacent the first spectral filter, for providing a cut-off wavelength within the spectral range of transmission of the first optical filter;

a photoelectric converting element responsive to the spectral range of transmission of light positioned after the respective first and second filters;

means for preliminarily adjusting an incident angle of light on the second interference filter to shift the cut-off wavelength and to adjust the spectral sensitivity of the light sensor assembly to a predetermined sensitivity, and means for holding the adjusted incident angle stationary during the entire conversion of light to electrical energy by the photoelectric converting element for the predetermined spectral band of light.

* * * * *